United States Patent
Thayer (12)

(10) Patent No.: US 6,173,869 B1
(45) Date of Patent: Jan. 16, 2001

(54) MULTI-PISTON, RATCHETED DISPENSING DEVICE

(75) Inventor: Jonathan Thayer, North Bergen, NJ (US)

(73) Assignee: Color Access, Inc., Melville, NY (US)

( * ) Notice: Under 35 U.S.C. 154(b), the term of this patent shall be extended for 0 days.

(21) Appl. No.: 09/404,132

(22) Filed: Sep. 23, 1999

(51) Int. Cl.[7] .................................................. G01F 11/00
(52) U.S. Cl. .............................................. 222/391; 222/137
(58) Field of Search ..................................... 222/391, 137

(56) References Cited

U.S. PATENT DOCUMENTS

| | | | |
|---|---|---|---|
| 2,356,874 | * | 8/1944 | Nageotte ............................... 222/391 |
| 2,541,949 | * | 2/1951 | Thacker et al. ....................... 222/391 |
| 3,001,524 | | 9/1961 | Miason et al. . |
| 3,378,176 | * | 4/1968 | Snyder .................................. 222/391 |
| 3,452,905 | | 7/1969 | Micallef . |
| 4,323,176 | | 4/1982 | Sartain ................................. 222/391 |
| 4,763,815 | * | 8/1988 | Von Schuckmann et al. ...... 222/391 |
| 4,892,232 | | 1/1990 | Martin . |
| 4,930,999 | | 6/1990 | Brunnet et al. . |
| 5,076,298 | | 12/1991 | Busch et al. . |
| 5,096,097 | | 3/1992 | Lina . |
| 5,183,187 | | 2/1993 | Martin et al. . |
| 5,356,037 | * | 10/1994 | Harrold ................................. 222/391 |
| 5,513,778 | | 5/1996 | Cardia et al. . |
| 5,566,865 | | 10/1996 | Jouillat et al. . |
| 5,570,821 | * | 11/1996 | DeJonge ............................... 222/391 |
| 5,860,572 | * | 1/1999 | Harrold et al. ....................... 222/391 |
| 5,979,708 | * | 11/1999 | Seager et al. ........................ 222/137 |
| 6,039,215 | * | 3/2000 | Bell ...................................... 222/137 |

FOREIGN PATENT DOCUMENTS 2721907    1/1996   (FR) .

* cited by examiner

Primary Examiner—Andres Kashnikow
Assistant Examiner—Christopher S. Kim
(74) Attorney, Agent, or Firm—Kenyon & Kenyon

(57) ABSTRACT

A multi-piston, ratcheted dispensing device for cosmetic and pharmaceutical formulations comprising a hollow body, the body being interiorly divided into at least two channels; a ratchet cup for applying force to at least two ratcheting members, each ratcheting member being in rigid contact with one of at least two pistons, each piston being disposed within the channels; at least one recoil member for biasing the ratchet cup away from the pistons; exit orifices disposed within the body; and, optionally, conductors for directing the dispensed product, sealing mechanisms to prevent dry-out of the product and an actuator.

26 Claims, 4 Drawing Sheets

MULTI-PISTON, RATCHETED DISPENSING DEVICE

FIELD OF THE INVENTION

This invention relates to dispensing devices, and more particularly to multi-piston devices that simultaneously dispense measured amounts of different materials, until the supply of materials is exhausted.

BACKGROUND OF THE INVENTION

New cosmetic formulations are increasingly viscous or contain solid components that are difficult or impossible to dispense using existing technology. Simultaneously, there exists a growing demand for cosmetic formulations with physiologically active components. But such components are often unstable in consumer products.

One response to the first problem has been to design mechanical pump dispensers that can handle today's more viscous products. To date, the results have not been encouraging. Mechanical micropumps can be of the traditional or so-called "airless" types, and are well known. See, for example, U.S. Pat. Nos. 3,001,524; 3,452,905; 4,892,232; 4,9303,999; 5,096,097; 5,183,187; 5,566,865.

One type of piston dispenser relies on an airless micropump mechanism to force flowable material out of a reservoir. On the return stroke of the pump mechanism a vacuum is created inside the reservoir. In response to the reduced pressure inside the reservoir, flowable material from the primary container moves into the reservoir, and simultaneously, the piston is pulled toward the reservoir, thus reducing the volume between the piston and the intake of the reservoir. With this type of device, and in the traditional non-airless pumps, only comparatively thin products can be made to flow because insufficient negative pressure is created inside the reservoir.

Furthermore, micropumps, because of the several small and delicate components of which they are comprised, are subject to failure of various types. The most common of these, perhaps, is leakage. Commonly, leakage may occur through the stem of the pump as a result of poor fit between the piston and the stem. Leakage may also occur from around the stem of the pump as a result of poor fit between the piston and the housing.

Poor fit between the components may be a result of the difficulties of holding to tolerance in manufacturing or it may be due to creep of the molded components before reaching a final set after manufacturing. Poor fit of the components may also be due to degradation of the components as a result of exposure to various elements, i.e. heat, cold, and chemical attack by the product.

In another piston-type dispensing device, a relatively high pressure region is located behind the piston. When the exit valve for the product is opened, the piston is driven by the pressure gradient and product is forced out of the open valve.

The primary disadvantages here are the hazards of manufacturing, transporting, storing, using and disposing of pressurized containers. Because of these hazards there are also limitations on the container materials and construction.

Furthermore, performance characteristics may suffer with this type of package. Specifically, as the pressure inside the container decreases with use, the dispensing characteristics deteriorate. Toward the end of the life of the package, product is dispensed slowly and weakly, creating an unfavorable impression on the consumer. Sometimes all of the pressure will be lost before the contents of the package are used up. Also, this type of package is subject to leaking as a result of constant pressure on the sealing surfaces of the package.

Other piston-type dispensers rely on mechanical pressure applied directly or indirectly to the piston. U.S. Pat. No. 5,513,778 discloses a dispenser for viscous fluid products that is operated by applying direct manual pressure to the piston, which is accessible through an opening on the bottom of the outer body. French Patent No. 2,721,907 discloses a cosmetic product dispenser for cream products in which the piston rides on a screw-threaded shaft when the shaft is rotated. This is an example of a piston that is activated by indirect pressure.

The '778 design is simple with few interrelated parts. Its disadvantages include the following: it requires two hands to operate; the piston disappears into the package making it inconvenient to apply pressure to the bottom of the piston; the force applied to the piston can result in the uncontrolled movement of the piston when static friction is suddenly overcome, resulting in a excessive dosing.

Dispensers that use indirect pressure such as the '907 design, are more complicated because a means of engagement must be supplied to transfer the applied pressure through the package to the piston. This increased complexity in design is disadvantageous in manufacturing, cost and use. This design also requires two hands to operate.

In response to the second problem, systems have been devised that allow the active components to be stored separately from the rest of the formulation. The consumer could then mix the components just prior to use. This system relies on the consumer mixing the components and doing so in the right proportions. More user friendly systems have the components mix just prior to, or upon exiting the container.

In such a typical configuration, two micropump devices or two pre-pressurized devices are ganged together and actuated by one actuator that fits over both valve stems. In practice, the results have not been satisfactory. In part, this is because of variations in the dispensed quantity from mechanism to mechanism. In the best cases, variations in a sample of like components dispensing the same product will be about 20%. Often the difference is greater. This means that unequal quantities of the two products are being dispensed.

Furthermore, this type of multi-dispenser does not perform well if the viscosities of the different products vary widely. The same micropump will have different dispensing characteristics for products with different theological properties, say, viscosity. This introduces additional variation in the relative quantity of the simultaneously dispensed products. This problem is made worse by uneven application of pressure on the actuator. If pressure is not transferred evenly to each valve stem, then each piston will not move the same distance, causing unequal dispensing of the two products.

Uneven use-up of the products is a serious drawback for at least two reasons. Firstly, the products were meant to be used together, but since one product will be used up before the other this becomes impossible. But even before any one of the products has been used up, the relative amount of each product in any one application will vary widely. In some cases this will render the combined product ineffective or give undesirable results. This is particularly true in treatments where one product activates the other or a desired reaction of the dispensed products is sought.

Another multi-dispenser is disclosed in French Patent No. 2,721,907. Here, a single composite piston fits into a doublebarreled container, and advances along both barrels via a screw-threaded rotating shaft to dispense the products. This design is comparatively complex, involving a screw-threaded mechanism, requires two hands to operate, and is limited to two separate product components.

U.S. Pat. No. 5,076,298 discloses a dispenser for multi-component hair cosmetics in which separately stored product components are transferred by capillary action, from their separate containers and into tines made of absorbent material, where the components mix, just prior to use. This design, relying as it does on capillary activity, is suitable only for thin, non-viscous products.

There is then, a growing demand in the personal care markets for a device that can reliably dispense multiple components in any desired ratio of volume, keeping the components separated until just prior to use. Also, a reliable dispensing device is needed for simultaneously dispensing multiple components when the viscosities of the multiple components are significantly different from each other. Furthermore, a device that can reliably dispense products of relatively high viscosity is needed.

None of the limitations discussed above is found in the present invention. The present invention does not rely on pre-pressurized contents. Nor does the present invention rely on small, delicate components to create fluid movement indirectly via a vacuum. There are no small, delicate parts susceptible to the kinds of failure discussed above. The number of parts is comparatively few. There is only one type of sealing interface which means that only one fitment requires precise tolerance. The present invention can be operated with one hand. The pressure surface does not disappear into the package making it difficult to dispense product. No accidental excessive dosing, nor uneven dosing is possible. More than two components may be separated prior to use. The device may be designed to dispense different predetermined quantities of the different products, thus ensuring the correct proportions of each product.

Some of the limitations just noted are avoided by using a ratchet design. This design allows for dosing a prefixed amount of product, prevents excessive dosing by providing a positive stop, and returns the pressure surface to its initial position for subsequent uses. There are many ratcheting dispensers with diverse mechanisms of operation. Many involve numerous pins, springs, clamps and support racks. None meets the criteria of being simple in design, containing few parts, and using a single ratchet support column to simultaneously dispense multiple products.

Accordingly, a main object of the invention is to provide an improved multi-dispenser which overcomes the disadvantages of known multi-dispensing devices, having simplified construction and being convenient to use.

Another object of the present invention is to provide an improved dispensing device that can simultaneously dispense two or more materials whose viscosities differ from one another significantly.

Another object of the present invention is to provide an improved dispensing device that can simultaneously dispense different predetermined quantities of two or more materials.

Another object of the present invention is to provide an improved dispensing device that can dispense a measured amount of materials of relatively high viscosity.

SUMMARY OF THE INVENTION

The present invention is a multi-dispensing device comprising a hollow body, the body being interiorly divided into at least two channels; a ratchet cup for applying force to at least two ratcheting members, each ratcheting member being in rigid contact with one of at least two pistons, each piston being disposed within the channels; at least one recoil member for biasing the ratchet cup away from the pistons; exit orifices disposed within the body; and, optionally, conductors for directing the dispensed product, sealing mechanisms to prevent dry-out of the product and an actuator.

The movement of each piston is moderated by a ratchet configuration which restricts the piston movement to discrete steps in one direction. All pistons act simultaneously to dispense a measured amount of material from each respective piston chamber until the chambers are empty. The dispensed material is conducted out of the container through the exit orifices.

Each dispensing operation is initiated by a mechanical action performed on the ratchet cup. This mechanical pressure is directly transferred to the pistons. The pistons are thus moved by mechanical force, and not in response to the ambient gas pressure. The ratchet cup is returned to its resting position by the recoil members.

BRIEF DESCRIPTION OF THE DRAWINGS

The present invention will be more fully understood when the specification is considered in conjunction with the appended drawings.

DETAILED DESCRIPTION OF THE INVENTION

Figure 1:
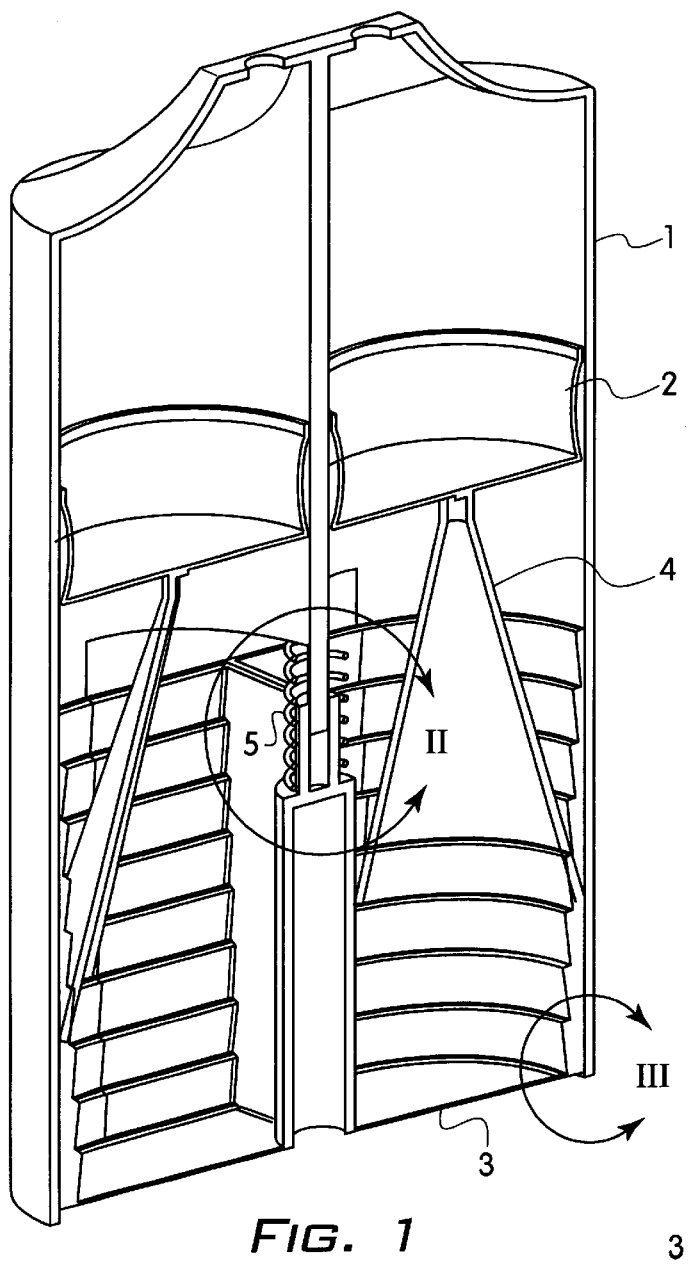
FIG. 1 is a section view of the dispenser of the present invention.

Referring to FIG. 1, the container comprises a body (1), at least two pistons (2), a ratchet cup (3), ratcheting members (4), and a recoil member (5). Optionally, conductors (6), sealing members (7), or an actuator (8, 9) may be included (see FIGS. 10, 11 and 12).

Figure 4:
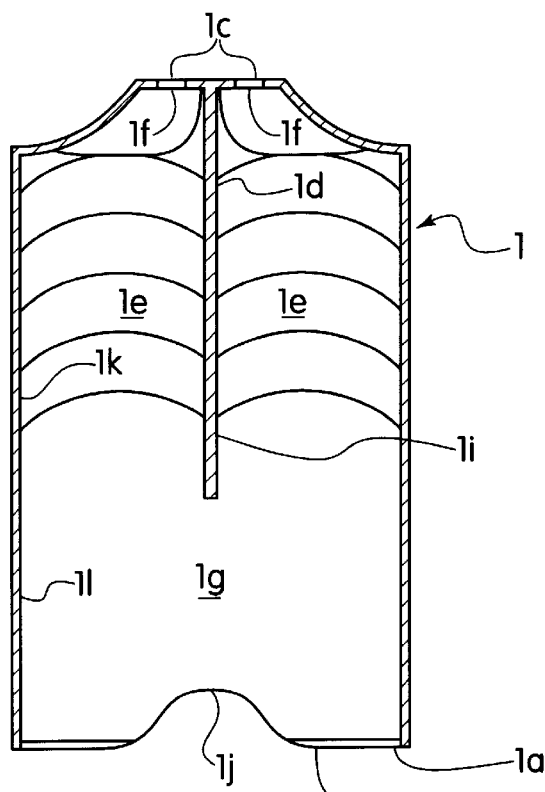
FIG. 4 is a section view of the body.
Figure 5:
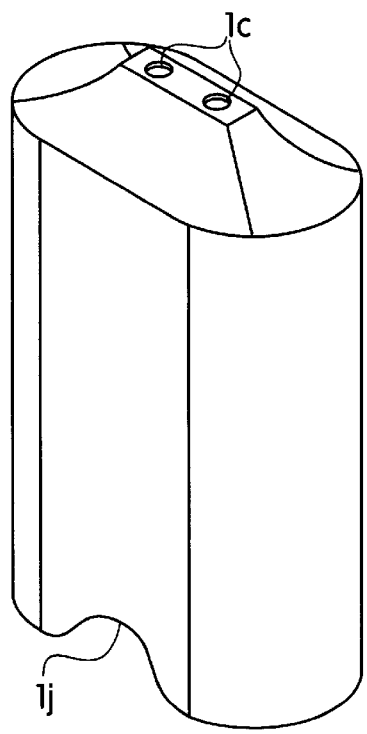
FIG. 5 is a perspective view of the body.

Referring now to FIGS. 4 and 5, the body (1) is the primary component with which the user has contact. The body allows the user to grip the dispensing device, and it confines the product that is to be dispensed. The body houses and supports the other members of the device. The body has a bottom surface (1a), which has an opening (1b) into which the ratchet cup (3) must fit. The top surface of the body has at least two exit orifices (1c). The body has at least one interior partition (1d) that divides the space inside the body into at least two channels (1e). The shape of the outside of the body may vary for aesthetic and utilitarian purposes.

The channels (1e) extend from below the top of the body to above the bottom of the body. The channels are capable of receiving a product and are in fluid communication with the exit orifices (1c). In the preferred embodiment the channels are connected to the exit orifices by ducts (1f). In this way, the products are directed from inside the channels (1e) to the outside of the dispensing device. The channels may have various cross sectional shapes. For example, the cross sectional shapes of the channels may be, but are not restricted to be, circular, semi-circular, square, D-shaped, hexagonal or octagonal. The cross sectional shape of the channels is, preferably, circular.

The cross sectional areas of the channels and the height of the ratchet steps (see below) determine the volume of product dispensed from each channel. By varying the cross sectional area of each channel in relation to one another, different, predetermined quantities of product may be dispensed from each channel.

Figure 3:
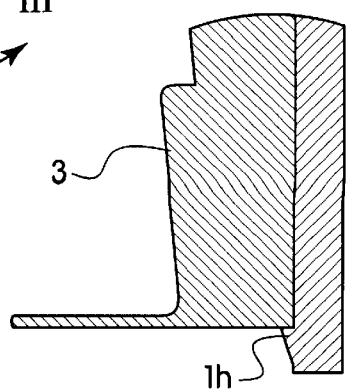
FIG. 3 is an enlarged view of detail B of FIG. 1, showing one embodiment of the retainer.

Below the interior partition (1d) of the body, and above the bottom surface (1a) of the body, is an undivided space (1g). This space is substantially occupied by the ratchet cup (3), ratcheting members (4), and recoil members (5). A guide column (1i) projects downward from the bottom of the interior partition into the undivided space. The purpose of the guide column will be made clear below. Referencing FIG. 3, the body has a retainer (1h) which does not allow the ratchet cup to back completely out of the body once it has been inserted. Preferably, the retainer is an integrally molded, raised protrusion, situated along or near the bottom of the interior surface of the body wall. The ratchet cup, is slightly larger than the opening defined by the protrusion. Upon assembly, the ratchet cup is forced through this opening and retained there by contact with the protrusion. The cross section of the protrusion may be semi-circular, i.e. a bead, square, triangular or any other shape sufficient for this purpose. With this type of retainer, the bottom of the ratchet cup is not sticking out of the body, i.e. the bottom of the ratchet cup is either flush with or above the bottom of the body.

In one embodiment there is at least one notch (1j) along the bottom of the side wall of the body for a finger cut-out. This allows the user or the actuator (see below) to access the ratchet cup (3) more easily. Preferably the position of the cut-out is such that the applied pressure will be symmetric regarding the pistons (2), thus providing equal force to all pistons, and minimizing any cocking of the ratchet cup.

One piston (2) is disposed within each channel (1e) of the body (1). Each piston has a bottom (2a) and one or more lateral surfaces (2b). Preferably, each piston will be open at the top, for reasons which will be made clear below. The cross sectional shape of the pistons is designed to be complementary to that of the channels (1e). Here and throughout, the term "complementary" means that the two cross sections are the same shape and that one member fits slidably within the other member, so that there is slideable contact between the two members.

The lateral surfaces (2b) of the pistons must be in appreciable contact with the lateral surfaces (1k) of the channels, so that significant seepage of the flowable mass into the area behind the piston (2), cannot occur. However, the appreciable contact between each piston (2) and its associated channel (1e) is such as to allow the smooth movement of the piston within the channel. These needs are typically achieved in the prior art by providing the piston with sealing lips—outward flares that are integrally molded along the top and/or bottom edge of the lateral surfaces. The sealing lips (2c) are flexible enough to squeeze into the channel, but because of the outward flare, the piston maintains sealing contact with the channel wall.

The bottom (2a) of each piston is in contact with the flowable mass contained within the associated channel (1e). In use, the piston (2) displaces a measured amount of fluid toward the top of the body (1), forcing it through the exit orifice (1c), and out of the device.

The ratchet cup (3) is inserted into the undivided space (1g) of the body. The ratchet cup is bounded laterally and inferiorly. Preferably, the cross section of the ratchet cup will be complementary to that of the undivided space (1g) of the body. "Complementary" is as defined above, so that the exterior lateral surface (3a) of the ratchet cup is in slideable contact with the interior lateral surface (11) of the body. The slideable contact permits the ratchet cup to move freely within the body, while ensuring that the ratchet cup will not be cocked when it reaches the end of its travel. This will reduce unequal dosing from different channels due to cocking of the ratchet cup. The present invention, however, does not depend on the ratchet cup and undivided space of the body having complementary cross sectional shapes. Therefore, as needed, the shapes of these two structures may differ.

The interior lateral surface (3b) of the ratchet cup circumscribes an open space. This open space is further bounded by the bottom of the ratchet cup (3c). A cross-member (3d) extends from one side of the cup to the other (see FIG. 7). A guide (3e) is disposed in the cross-member and is positioned to receive the guide column (1i) of the body. Preferably, the cross section of the guide is complementary to that of the guide column. Once assembled, and in normal use, the cross member of the ratchet cup will slide along the guide column of the body. This configuration will further limit any cocking of the ratchet cup and reduce the possibility of unequal dosing from different channels.

Figure 2:
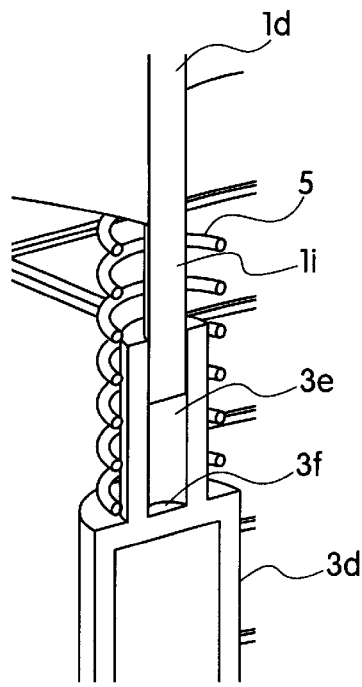
FIG. 2 is an enlarged view of detail A of FIG. 1.
Figure 8:
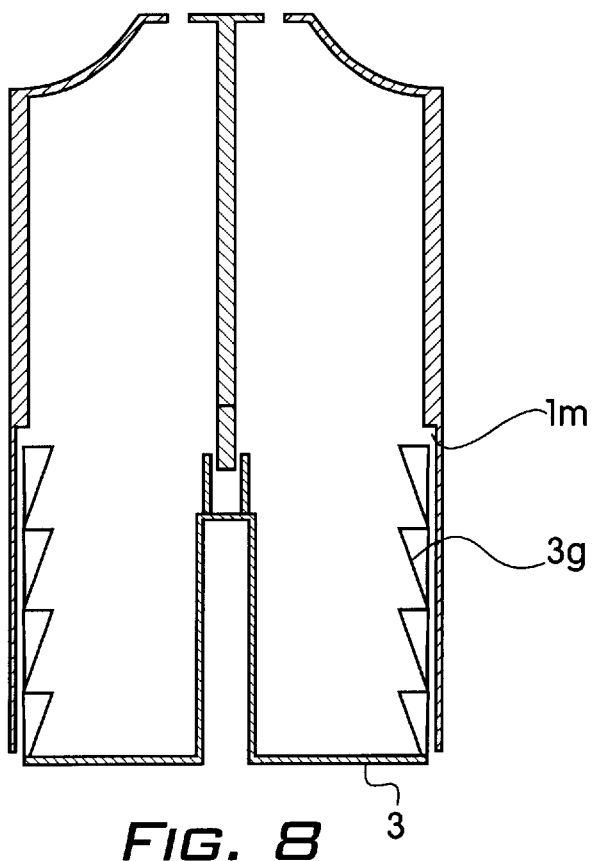
FIG. 8 is a section view of the assembled body and ratchet cup.

The guide (3e) has a bottom (3f) (see FIG. 2). In use, the bottom of the guide engages bottom of the guide column (1i), and limits the upward travel of the ratchet cup. The bottom of the guide thus forms a stop for the upward travel of the ratchet cup. The limits of travel of the ratchet cup (3) are thus defined by the retainer (1h) of the body and the bottom (3f) of the guide. Alternatively, the stop may be a step-in (1m) integrally molded on the interior of the side walls of the body, positioned to engage the top of the ratchet cup after the ratchet cup has travelled a predetermined distance (see FIG. 8).

Figure 7:
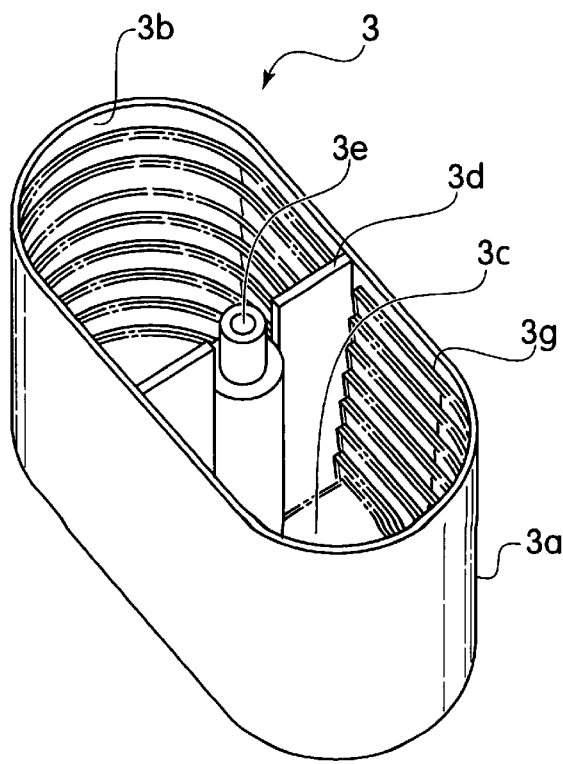
FIG. 7 is a perspective view of the ratchet cup.

Equally spaced ratchet steps (3g) project out from the interior lateral surface (3b) of the ratchet cup, into the open space (see FIG. 7). The top surface of each step, on which a ratcheting member (4) will sit, extends perpendicularly from the interior lateral surface of the ratchet cup. The steps (3g) are designed to allow the movement of the ratcheting members toward the top of the body (1), but not toward the bottom of the body. For this reason, it is preferable that the steps are graded so that the top of each step projects farther into the open space than the bottom of the step. The specific shape of the ratchet steps will vary, depending on molding limitations and the shape of the ratchet cup from which the steps project. For example, if the ratchet cup is cylindrical, then the top surface of the ratchet step could be annular.

As mentioned above, the limits of travel of the ratchet cup (3) are defined by the retainer (1h) of the body and the bottom (3f) of the guide. The length of this travel must be equal to or greater than the height of the tallest ratchet step (3g). Preferably, the length of this travel is equal to the height of the tallest ratchet step.

Figure 9:
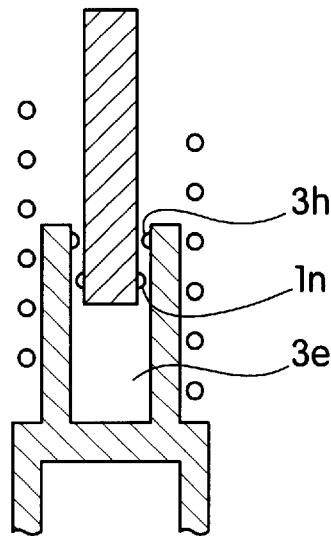
FIG. 9 is another embodiment of the retainer.

FIG. 9 shows another embodiment of the retainer. The guide (3e) of the cross member may, on its inside surface, be provided with one of a pair of interfering raised protrusions (3h). If this is done, then another protrusion (1n) is located on the guide column (1i), near the bottom of the guide column. The cross section of the protrusions may be semi-circular, i.e. a bead, square, triangular or any other shape sufficient for this purpose. In this way, when the guide column is pushed through the guide, the guide column is unable, in normal use of the invention, to back out of the cross member because of the interfering protrusions. With this type of retainer, the bottom of the ratchet cup may or may not stick out of the bottom of the body.

Optionally, the exterior bottom surface of the ratchet cup has a depression for comfortably receiving the consumer's finger and for guiding the placement of the consumer's finger. Preferably, the position of the depression is such that the applied finger pressure will be symmetric regarding the pistons, thus providing equal force to all pistons, and minimizing any cocking of the ratchet cup.

Each ratcheting member (4), in its initial position, prior to first use, is appreciably disposed within the open space of the ratchet cup (3). Each ratcheting member (4) has two ends (see FIG. 1). One end engages an associated piston (2), and the other end engages the ratchet steps (3g). One or both of these engagements must be flexible to allow the bottom of the ratcheting member to deflect laterally as it slides up the side of and onto the next higher step.

Figure 6:
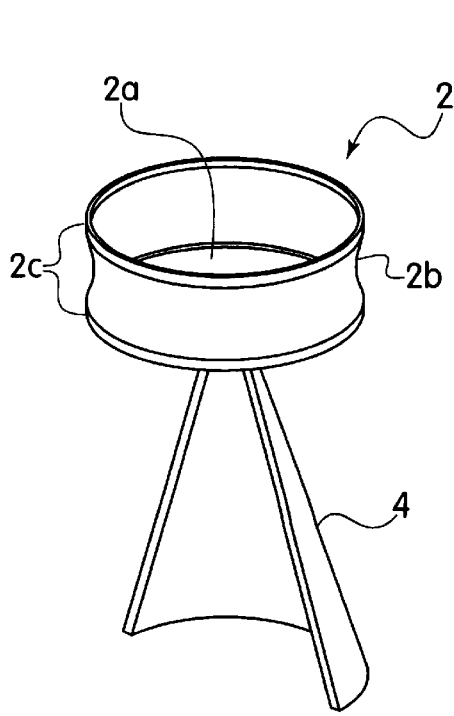
FIG. 6 is a perspective view of the assembled piston and ratcheting member.

In the preferred embodiment, the engagement between the piston and the ratcheting member will be flexible, while the lower portion of the ratcheting member will be molded to a thickness that does not allow appreciable flexing. This arrangement is preferred because less torquing of the piston will occur when the flexible portion of the ratcheting member is closer to the piston. To create a flexible engagement between the piston and ratcheting member, the ratcheting member may be pivotally attached to the bottom of the piston and provided with a recoil action via a spring. Or, preferably, it may be integrally molded to the base of the piston in such a way that the ratcheting member is flexible. This may be accomplished by varying the thickness of the material used to form the ratcheting member at the location where the ratcheting member meets the piston. If the ratcheting member and the piston are integrally molded, then it is preferable to mold the piston so that it is open at the top (as shown in FIG. 6, for example). The open top design will allow these elements to be integrally molded and easily removed from the mold.

The engagement between the bottom surface of each ratcheting member and the ratchet steps (3g) may be rigid or flexible. For a given material, this can be achieved by molding the lower portion of the ratcheting member to a thickness that permits or does not permit appreciable flexing. While the ratcheting member must be flexible to allow lateral movement relative to the ratchet steps, it must also be sufficiently rigid to support the piston and column of product above the piston. This is achieved by the choice of materials used as well as the shape of the ratcheting member. The ratcheting member may be finger-like or semi-conical or any shape complementary to the contour of the top surface of the ratchet steps.

At least one recoil member (5) is included for returning the ratchet cup (3) to its resting position. The at least one recoil member is a metal, rubber, plastic or elastomeric member braced against and pushing off of the body (1). The other end of the member is in substantial communication with the ratchet cup, either by direct contact with the ratchet cup or through an intermediary member. The recoil members may be any of various resiliently compressible or bendable bodies such as: springs, flexible finger-like members, rubber or elastomeric stoppers.

In the preferred embodiment, a metal coil spring is disposed over the guide column (1i) of the body, so that the spring is trapped between the bottom of the interior partition (1d) of the body and the cross-member (3d) of the ratchet cup (see FIG. 2). Alternatively, any resiliently compressible body with a central bore suitable to receive the guide column of the body, may be used in place of the spring.

Figure 10:
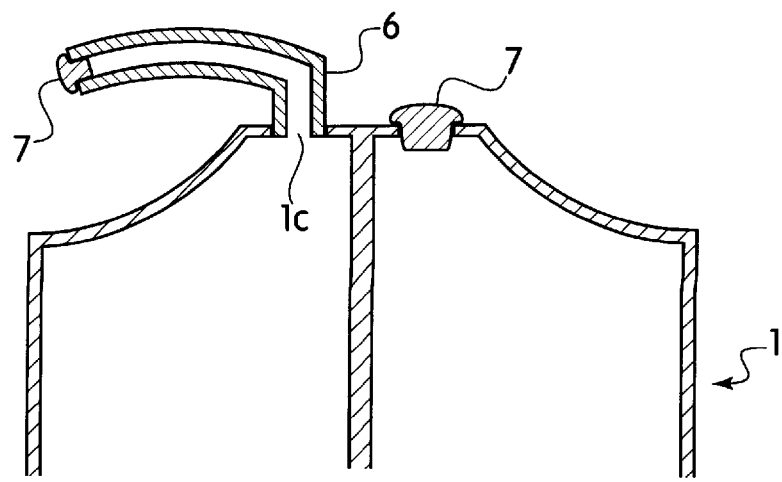
FIG. 10 shows the conductor and sealing mechanism in cooperation with the body.

Optionally, each exit orifice (1c) of the top surface of the body may be in contact with one or more conductors (6), to direct the dispensed fluid away from the body (1) of the device (see FIG. 10). The conductor may be, for example, any commercially available nozzle well known and typically used in the dispensing of creams and lotions.

Optionally, each exit orifice (1c) or each conductor (6) may be provided with a sealing mechanism (7). The purpose of the sealing mechanism is to prevent leakage from the dispensing device and to prevent dry-out of the product inside the dispensing device. The sealing mechanism may be any well known type of device commonly used for this purpose, for example, a plug that is friction-fitted or screw-engaged by cooperating threads.

Optionally, an actuator (8) is provided on the outside of the body. The optional actuator modifies the way in which the user interacts with the device by directing the user to grip the device in a particular way. As described thus far, the device is most conveniently used in an inverted mode, with the exit orifices downward. However, this may not be desired for aesthetic or practical reasons. If some other orientation is preferred during the intended use, then the user will be guided into that orientation by the design and placement of the actuator. The actuator may also provide leverage thus requiring less effort to dispense a viscous product.

Figure 11:
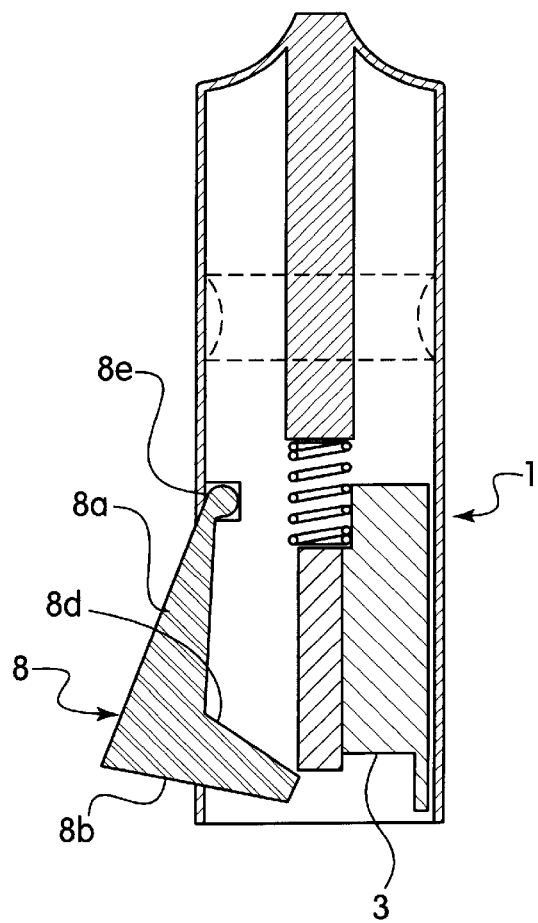
FIG. 11 shows the first embodiment of the actuator.

An example of a cam-type actuator is shown in FIG. 11. The actuator is a rigid member in two sections. The top section (8a) is longer than the bottom section (8b) and is pivotally attached to the exterior of the body. Optionally, the side wall of the body is provided with a recess(1m) into which the actuator fits. This allows the package to retain a sleek appearance, without having the actuator protruding out from the body. In its rest position the top section projects down and away from the body.

The bottom section (8b) of the actuator is connected to the distal end of the top section. The distal end of the bottom section projects in the direction of the ratchet cup (3). The bottom section has a top surface (8d) that is ramped away from the ratchet cup. In its rest position, this top surface is in contact or nearly in contact with the ratchet cup.

The top section is attached to the exterior of the body by any coupling (8e) that permits pivoting, i.e. a dowel, hook, pin, hinge, ball-in-socket joint, etc., may be used. Thus when finger pressure is applied to the top section (8a), the top surface of the bottom section (8b) is forced into contact with the bottom of the ratchet cup (3) and pushes the ratchet cup upward for as long as the top section is in motion. The height of the ramp is matched to the height of the ratchet steps, so that one full depression of the actuator will move the ratchet cup up one step. With this design, the dispensing device may be operated in any position, with one hand, with less force required by the user. The top section is optionally fitted with contours and grip features for comfort and control.

Figure 12:
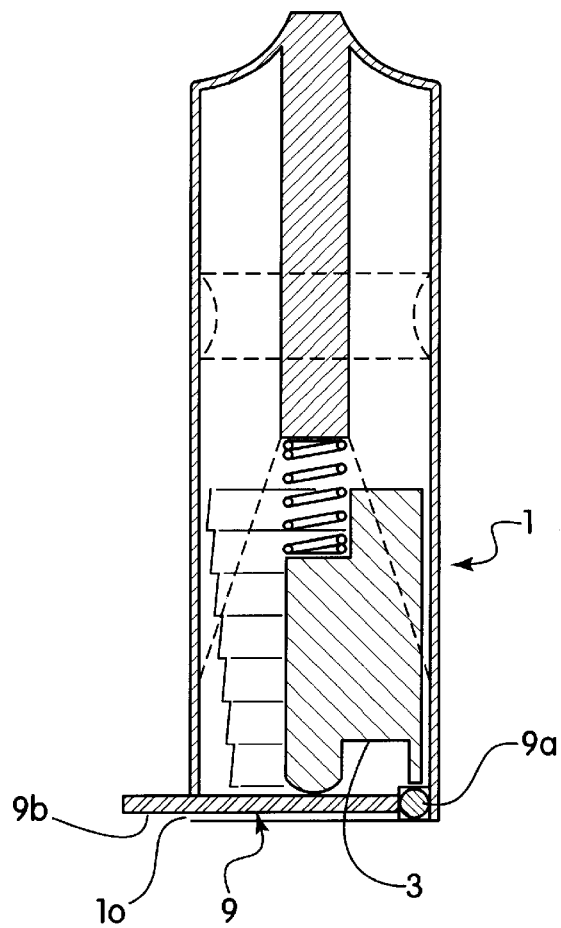
FIG. 12 shows the second embodiment of the actuator.

An alternate actuator is of the lever-type (see FIG. 12). A lever (9) is pivotally attached to a side wall of the body. The lever is disposed below the ratchet cup and extends from the pivot (9a), across the undivided space of the body and out of a slot (1o) located in the side wall of the body. The portion of the lever that extends out of the side wall of the body provides a surface (9b) to which upward pressure may be applied by the consumer. The upwardly biased lever will lift the ratchet cup, thus dispensing product. The height of the slot is matched to the of the ratchet steps, so that lifting the lever through the full height of the slot will move the ratchet cup up one step.

The preferred mode of operation of the device will now be described. Finger pressure is applied to the top section of the cam-type actuator (8) pushing the actuator further into the recess of the body. The ramped lower section of the actuator contacts the exterior bottom surface of the ratchet cup (3), to bias the ratchet cup further into the body (1). The movement of the ratchet cup causes the ratcheting members (4) to move in the same direction as the ratchet cup. The ratcheting members (4), being in rigid, physical contact with the pistons (2), cause the pistons to move in the same direction, thus pressurizing the fluid within the circular channels (1e) of the body. This forces the fluid out of the channels, through the ducts (1f), out the exit orifices (1c) and through and out of the nozzles (6).

The uniform movement of the ratchet cup (3), ratcheting members (4) and pistons (2) continues until the bottom (1i) of the guide column contacts the bottom (3f) of the guide of the cross member (3d) of the ratchet cup. At this point the spring recoil member (5) is maximally compressed. When the finger pressure is removed, the spring recoil member pushes off of the bottom of the interior partition (1d) forcing the ratchet cup toward its rest position. While the ratchet cup is recoiling, the bottom surface of the ratchet cup forces the ramped lower portion of the actuator (8) outward, toward its rest position. This movement continues until the ratchet cup engages the retainer (1h) of the body. The return movement of the ratchet cup (3) causes the bottom surface of each ratcheting member (4) to travel along the graded surface of the ratchet step (3g). This causes each ratcheting member to flex in the area where the ratcheting member meets the piston. The ratcheting member is thus, laterally deflected until the bottom surface of the ratcheting member passes onto the top surface of the ratcheting step, when the ratcheting member snaps back from its laterally deflected position. The device is immediately ready for reuse. This process will continue until the ratcheting members (4) are resting on the ratchet step (3f) nearest to the top of the ratchet cup. Preferably, this will place the pistons (2) appreciably near the tops of the channels (1e), and substantially all of the fluid will have been dispensed.

It will be appreciated that various modifications of the present invention will be apparent to those skilled in the art. Accordingly, no limitations of the present invention are intended by way of the accompanying description and drawings, except as set forth in the appended claims.

What is claimed is:

1. A multi-dispensing device for simultaneously dispensing two or more viscous fluids, which comprises:
   a hollow body having
      a top;
      a bottom;
      side walls;
      at least one partition that interiorly divides the body into at least two channels, the channels extending from below the top of the body to above the bottom of the body and having a cross sectional shape; and
      an undivided space below the channels and above the bottom of the body;
   at least two pistons, each said piston being disposed within one of the channels and having a cross sectional shape that is complementary to cross sectional shape of the channel in which it is disposed;
   a slideable ratchet cup disposed within the undivided space of the body, said cup comprising lateral surfaces, a bottom surface and ratchet steps, each said ratchet step having a height;
   at least two ratcheting members, each said ratcheting member being in communication with the ratchet cup and one of the pistons;
   at least one recoil member for biasing the ratchet cup toward its resting position;
   a retainer that maintains the ratchet cup within the undivided space of the body; and
   exit orifices disposed within the body.

2. The multi-dispensing device of claim 1 wherein the cross sectional shape of each of said channels is circular.

3. The multi-dispensing device of claim 1 further comprising at least one stop for limiting to a predetermined distance, the sliding of the slideable ratchet cup.

4. The multi-dispensing device of claim 3 wherein the stop is at least one integrally molded step-in located in the side walls of the body.

5. The multi-dispensing device of claim 3 wherein the predetermined distance is equal to or greater than the height of the tallest ratchet step.

6. The multi-dispensing device of claim 1 wherein the ratchet cup has a cross sectional shape and the undivided space of the body has a cross sectional shape, the cross sectional shapes being complementary.

7. The multi-dispensing device of claim 1 wherein a guide column projects downward from the bottom of the partition.

8. The multi-dispensing device of claim 7 wherein the ratchet cup has a cross member, the cross member having a guide that is positioned to receive the guide column.

9. The multi-dispensing device of claim 8 wherein each of the recoil members is a spring, a flexible finger-like member or an elastomeric body.

10. The multi-dispensing device of claim 9 wherein the recoil member is a spring that is trapped between the partition and cross member of the ratchet cup.

11. The multi-dispensing device of claim 1 wherein the retainer is a raised protrusion situated on the interior surface of the body wall, near the bottom of the body.

12. The multi-dispensing device of claim 8 wherein the retainer is a pair of interfering protrusions, one protrusion located on the inside surface of the guide and one protrusion located on the guide column.

13. The multi-dispensing device of claim 1 wherein each said ratcheting member is in flexible contact with one of said pistons.

14. The multi-dispensing device of claim 13 wherein the ratcheting member is integrally molded with the base of the piston.

15. The multi-dispensing device of claim 14 wherein each said ratcheting members is semi-conical or finger-like.

16. The multi-dispensing device of claim 1 wherein each said ratcheting members is in flexible contact with the ratcheting steps.

17. The multi-dispensing device of claim 16 wherein each said ratcheting member is semi-conical or finger-like.

18. The multi-dispensing device of claim 1 wherein the exit orifices are in fluid communication with the channels.

19. The multi-dispensing device of claim 18 wherein the exit orifices are connected to the channels by ducts.

20. The multi-dispensing device of claim 1 wherein at least one notch is disposed in the side walls of the body for exposing a portion of the ratchet cup.

21. The multi-dispensing device of claim 1 further comprising a nozzle.

22. The multi-dispensing device of claim 21 further comprising a plug.

23. The multi-dispensing device of claim 1 wherein each of the channels has a cross sectional area, the magnitudes of the cross sectional areas being not all equal.

24. A multi-dispensing device for simultaneously dispensing two or more viscous fluids, which comprises:
- a hollow body having
  - a top;
  - a bottom;
  - side walls;
  - at least one partition that interiorly divides the body into at least two channels, said channels extending from below the top of the body to above the bottom of the body and having a cross sectional shape; and
  - an undivided space below the channels and above the bottom of the body;
- at least two pistons, each said piston being disposed within one of the channels and having a cross sectional shape that is complementary to cross sectional shape of the channel in which it is disposed;
- a slideable ratchet cup disposed within the undivided space of the body, said cup comprising lateral surfaces, a bottom surface and ratchet steps, each said ratchet step having a height;
- at least two ratcheting members, each said ratcheting member being in communication with the ratchet cup and one of the pistons;
- at least one recoil member for biasing the ratchet cup toward its resting position;
- a retainer that maintains the ratchet cup within the undivided space of the body;
- exit orifices disposed within the body; and
- an actuator.

25. The multi-dispensing device of claim 24 wherein the actuator comprises:
- a top section that is pivotally attached to the side wall body; and
- a bottom section that is rigidly attached to the top section and that projects in the direction of the ratchet cup and has a top surface.

26. The multi-dispensing device of claim 24 wherein the actuator comprises:
- a lever that is pivotally attached to the side wall of the body, the lever extending from the pivot, across the undivided space of the body and out of a slot located in the wall of the body.

* * * * *